Sept. 7, 1948.  F. P. COFFIN, JR., ET AL  2,449,035
SMOOTHING SERVO
Filed April 12, 1946  3 Sheets-Sheet 1

INVENTORS
FRANCIS P. COFFIN, JR
PRESCOTT D. CROUT
FRANK E. BOTHWELL
BY
ATTORNEY

INVENTORS
FRANCIS P. COFFIN, JR.
PRESCOTT D. CROUT
FRANK E. BOTHWELL

BY

ATTORNEY

INVENTORS
FRANCIS P. COFFIN JR.
PRESCOTT D. CROUT
FRANK E. BOTHWELL

BY

ATTORNEY

Patented Sept. 7, 1948

2,449,035

UNITED STATES PATENT OFFICE 2,449,035

SMOOTHING SERVO

Francis P. Coffin, Jr., Schenectady, N. Y., and Frank E. Bothwell, Boston, and Prescott D. Crout, Lexington, Mass., assignors, by mesne assignments, to the United States of America as represented by the Secretary of the Navy Application April 12, 1946, Serial No. 661,594

4 Claims. (Cl. 318—18)

This invention relates in general to apparatus for the intepretation of electrical data, and more specifically to a novel circuit for smoothing the instantaneous erratic fluctuations of a servo mechanism input error signal, which fluctuations tend to obscure the normal, desired signal variations.

Data smoothing circuits of the type herein described find application in electrical equipment whenever the normal signal trend is disturbed by discontinuous "jitter." For the purpose of clarifying the discussion of this circuit, reference is made to a particular radar problem, which is representative of data smoothing problems encountered in practice. Thus consider a radar installation utilizing a spinning, directional antenna for the detection of targets. A plurality of target echoes are obtained as the radiated, pulsed beam sweeps a single reflecting object such as a ship. Factors influencing the number of echo pulses are the radar pulse repetition frequency, the directivity of the antenna beam, the azimuth angle subtended by the target ship and the angular speed of the antenna. It may be expected that the relative intensity of a single echo pulse would be solely a function of the radiated beam intensity at the particular instant considered, that the video envelope of all echoes obtained from a single target during a scan would comprise a smooth wave, having a maximum at a point corresponding to the point of maximum radiated energy in the directional beam, and that the motion, in time, of this envelope would conform to the actual angular movement of the ship. Such considerations have been found contrary to fact, and it has been observed that echoes obtained from a fixed target ship do not lie under a smooth envelope, and that the apparent echo maximum, and the envelope center of area are highly erratic functions, and "jitter" from scan to scan. A theoretical analysis indicates that this effect should be expected due to the variable interference patterns obtained as the reflecting ship changes its relative position and aspect due to rolling, pitching, and the like. Thus on one scan the video envelope of all reflection might have its maximum at the true azimuth of the ship. On the following scan the video envelope might erroneously indicate a shift in azimuth in one direction, and the next scan a further shift by a different amount.

It is apparent that such a jitter in the azimuth electrical data would preclude the use thereof for an automatic azimuth tracking system. It is therefore an object of this invention to provide a data smoothing circuit and servo system capable of delivering an output indicative of the input signal trend and substantially independent of the jitter thereof. This desired result is achieved by an electro-mechanical system wherein input and output are interrelated by a predetermined equation of motion, involving inertia and damping.

Accordingly, a further object of the present invention is to provide an electrical circuit, the design of which is governed by the synthesis of a differential equation of motion which satisfies the predetermined data smoothing requirements.

Another object of our invention is to provide apparatus for smoothing radar data obtained from a reflecting target during uniform antenna scans, such that automatic target tracking upon the smoothed signal is possible.

These and other objects of our invention will now become apparent from the following specification taken in connection with the accompanying drawing in which.

Figure 1:
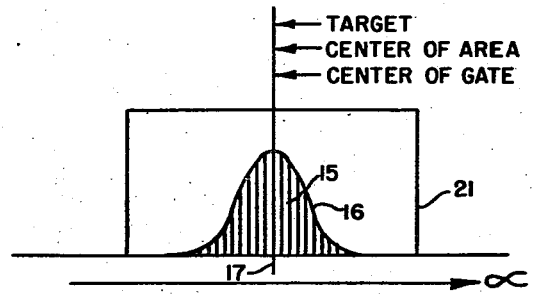
Fig. 1 is a graphical illustration of the idealized radar response plotted as a function of scanning angle.

Referring now to Fig. 1, there is graphically illustrated the idealized radar response as obtained by a fixed antenna scanning a fixed target. The curve indicates the amplitude of individual echo pulses such as 15 as a function of the scanning angle, designated as $a$, with respect to a predetermined fixed bearing. The envelope 16 of the received pulses is, for this idealized example a smooth curve, symmetrical about a maximum pulse echo. The amplitude of a pulse and the extent of the angle covered by the envelope 16 is a function of the various factors such as radar beam width and target angle as hereinabove discussed. In this example, the angular position 17 of the maximum received pulse is representative of the target bearing and corresponds with the axis of symmetry passing through the center of area under the pulse envelope 16. There is also illustrated a rectangular "gate" 21 symmetrically disposed with respect to the pulse envelope 16 and representative of an angle during which period the target in question is "illuminated" and during which period the indicating or other equipment at the radar receiver obtains information pertinent to the target. If the target producing the echo pulses 15 were in motion, then the center of target angular position 17 would move in azimuth at a corresponding rate from scan to scan of the rotatable antenna. Thus, for automatic tracking it is desirable to provide apparatus for shifting the gate 21 such that the center thereof continuously corresponds to the angular position of the center of target. In practice the gate 21 is a rectangular voltage block, the duration of which corresponds to the time required for the antenna to scan the angle covered by the gate. The voltage gate switches on the indicating circuits.

Figure 2:
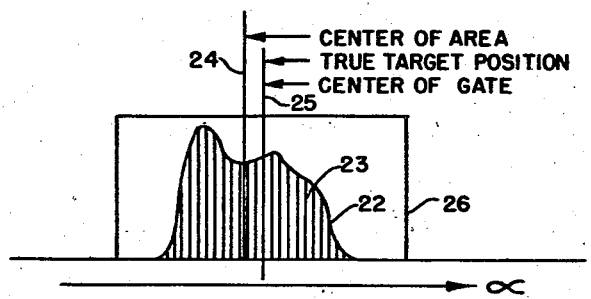
Fig. 2 is a graphical illustration of a radar response and shows the condition normally obtained in practice.

Actually the ideal scanning situation illustrated is seldom obtained. A truer picture thereof is illustrated in Fig. 2 wherein the envelope 22 of the received echo pulses 23 is a highly irregular function of the scanning angle for reasons having as a basis the interference of the reflected waves. The axis 24 indicating the angular position of the center of area under envelope 22 is generally not midway between the angular extremes of the envelop 22, and neither the center of area 24 nor the peak echo corresponds with the true position 25 in azimuth of the target. A rectangular gate 26 for illuminating the particular target in question is illustrated having its position symmetrical relative to the true target position 25. The problem encountered is thus, the maintenance of the center of gate 26 in coincidence with the true target position 25 at all times and independent of the apparent jitter of the response center of area 24. For this purpose it is necessary to smooth the recurrent data, such as that shown in Fig. 2, obtained upon successive scans of the antenna.

Figure 3:
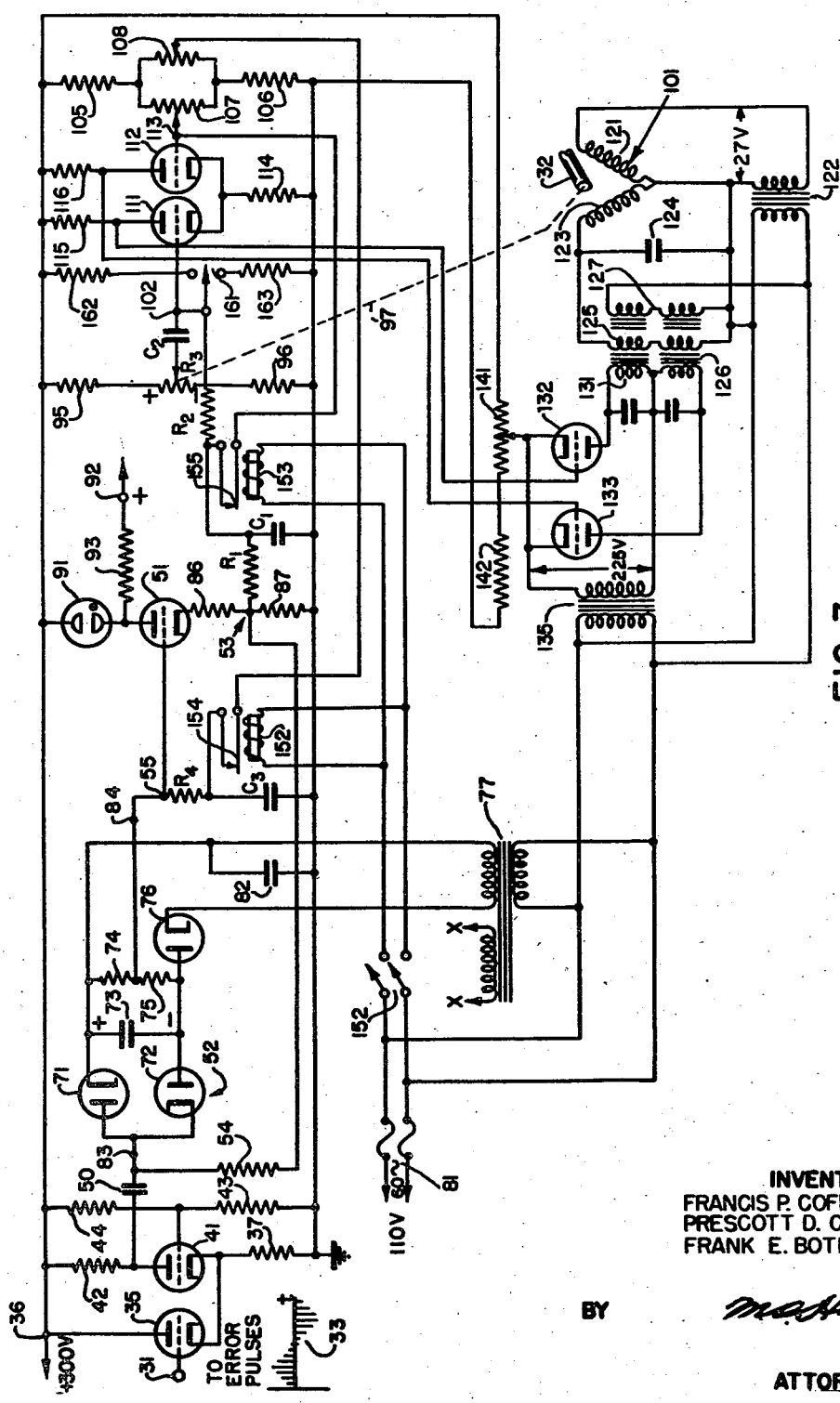
Fig. 3 is a detailed schematic circuit diagram of the novel data smoothing servo mechanism of the present invention.

In Fig. 3 there is shown a preferred embodiment of a data smoothing circuit and servo system capable of providing a mechanical output which corresponds to the general trend of signal variation applied thereto. The operation of this servo, in accordance with the principles of the present invention, is governed by an equation of motion, that is, a relation between the electrical information applied at input terminal 31 and the mechanical output at rotatable shaft 32, as follows:

(1) $$I\frac{d^2\theta}{dt^2} + C\frac{d\theta}{dt} = K_1(\phi-\theta) + K_2\int_0^t(\phi-\theta)dt$$

wherein, $\phi$ and $\theta$ are representative of the input and output, respectively, of the servo, and wherein I, C, $K_1$, and $K_2$ are constants. A study of this equation indicates that the first term on the right hand side involves the difference between input and output, that is, $\phi-\theta$, and is accordingly proportional to the system error, a factor to be discussed in greater detail hereinbelow. The first and second terms of the left hand side include the second and first derivatives of the servo output, and are from elementary mechanical considerations characteristic of inertia and damping respectively. It has been observed that servo having an equation of motion involving solely the three terms hereinabove discussed, has the undesirable feature of a lag error. This is compensated by the addition of the second term on the right hand side of Equation 1, proportional to the integral of the error signal.

The servo system illustrated in Fig. 3 comprises essentially the results of the synthesis of Equation 1. When utilized in connection with the special radar azimuth tracking system hereinabove mentioned, the mechanical output at shaft 32 is utilized to position the tracking gate 26, Fig. 2, and substantially maintain the azimuth thereof on the true target position.

The input signal applied to the servo at terminal 31 is derived from the radar target data received, having the waveform illustrated by the succession of pulses 23 under envelope 22 Fig. 2. This input signal is in the form of pulses, at the repetition rate of the pulses 23 and is of a nature such that each pulse appearing at terminal 31 is instantaneously proportional, insofar as amplitude is concerned, to the product of the displacement of the corresponding pulse 23 from the center of gate position 25 and the amplitude of the same pulse 23 of the envelope 22. This input signal is graphically illustrated by the waveform 33 at terminal 31 Fig. 3. It is to be noted that the pulses 33 are plotted as a function of time, whereas the pulses 22 are shown as a function of the scanning angle, $\alpha$. However, for an antenna spinning at a constant speed, there is a direct, linear relationship between motion in azimuth and time.

The particular system for obtaining the input signal 33 utilizes, in one embodiment thereof, two sawtooth voltages, one rising and one falling during the period of time represented by the gate 26, which voltages are combined with the radar echo pulses. However, the means for generating this waveform, forms no part of the present invention and will not be discussed further. A series of pulses, such as 33, appears at terminal 31 during each scan of the antenna. For an antenna rotating at normal scanning speed the time period of "illumination" of a target, and accordingly the period of application of pulses at terminal 31 is small. The rate of application of signals to terminal 31 corresponds to the antenna scanning rate. The total energy content of the pulses 33 obtained during each scan is directly proportional to the error, or deviation of the center of area 24 from the center 25 of the "illuminating" gate 26 of a pulse group such as shown in Fig. 2, and therefore this signal is herein called the error signal.

A cathode follower, comprising triode 35, having the plate thereof connected to a positive, regulated power supply line 36 and employing cathode load resistor 37 is used as a high impedance input circuit to the servo system This is followed by a stage of amplification consisting of triode 41, the plate of which is connected to the positive source 36 through load resistor 42. The pulsed signal is coupled to the amplifier 41 by connecting its cathode to that of cathode follower 35. A positive bias is placed upon the grid of amplifier 41 by voltage divider resistors 43 and 44, which bias provides a normal negative grid relative to cathode for the coupling system employed.

The amplified pulsed error signal appearing at the plate of amplifier 41 is coupled to the smoothing circuit, which functions in accordance with the differential equation of motion (1). The steps involved in the synthesis of a physical system having this equation of motion are now presented to facilitate the understanding of the circuit of Fig. 3.

Figure 4:
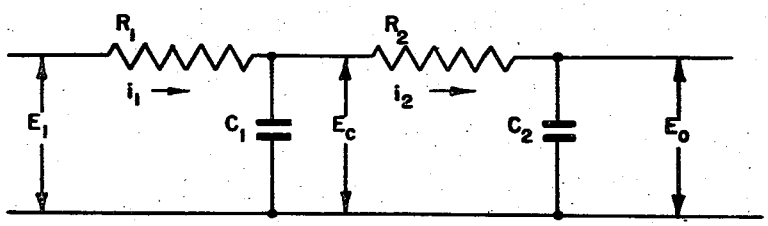
Figs. 4, 5, 6, 7 and 8 are circuit breakdowns of the data smoothing circuit illustrated in Fig. 3 for the purpose of properly explaining the operation thereof.

In Equation 1 consider the right hand member thereof as a voltage applied to a network whose response is given by the left hand member. In Fig. 4 there is illustrated a resistance capacitance network having an input applied voltage $E_1$ and an output voltage $E_o$. Using the symbols for the circuit constants as designated on the drawing and applying Kirchoff's laws, the following system of equations is established:

(2)
$$\begin{cases} E_i = E_o + i_1 R_1 \\ E_o = E_o + i_2 R_2 \\ i_1 = i_2 + C_1 \frac{dE_o}{dt} \\ i_2 = C_2 \frac{dE_o}{dt} \end{cases}$$

Eliminating $E_c$, $i_1$, and $i_2$ in Equations 2 gives (3) $(R_1 R_2 C_1 C_2) \frac{d^2 E_o}{dt^2} + (R_1 C_1 + R_1 C_2 + R_2 C_2) \frac{dE_o}{dt} = E_i - E_o$ Thus, the network of Fig. 4 provides an equation of motion of the desired form with the exception that the driving term is $E_i - E_o$, Equation 3, instead of $E_i$.

Figure 5:
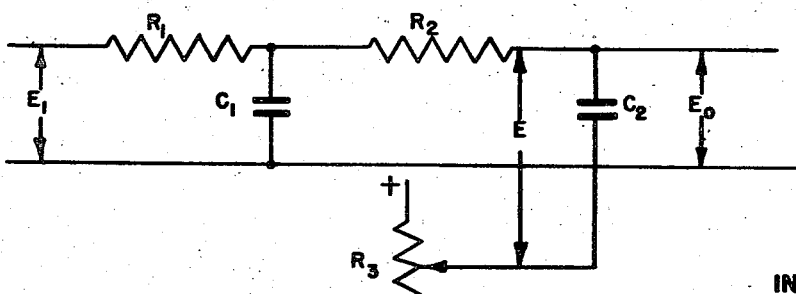

In Fig. 5, there is illustrated a modification of the circuit shown in Fig. 4 which functions to correct for this difference in the driving term. In this network, the capacitor $C_2$ is disconnected from its common connection with capacitor $C_1$ and connected instead to the movable tap of a potentiometer $R_3$, which in turn is energized by a power source of polarity as indicated. The output voltage $E_o$ is used to drive a position servo, in a manner to be described, which servo mechanically determines the movement and position of the potentiometer arm of $R_3$. If the servo is operative such that the output voltage $E_o$ is maintained at zero at all times, then, the voltage $E$ across capacitor $C_2$ may be expressed by the differential equation:

(4) $(R_1 R_2 C_1 C_2) \frac{d^2 E}{dt^2} + (R_1 C_1 + R_1 C_2 + R_2 C_2) \frac{dE}{dt} = E_i$ Thus, for an applied driving potential $E_i$, the circuit of Fig. 5 provides a voltage $E$, influenced by inertia and damping as indicated by the first and second terms respectively of the left hand member of Equation 4. It is to be noted that if the potentiometer $R_3$ is linear with respect to its shaft rotation, then the angular movement of the shaft also satisfies Equation 4. The application of this fact will be explained later.

Figure 6:
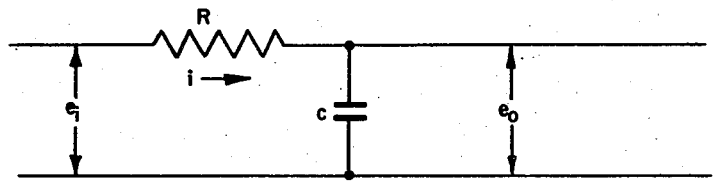

For the synthesis of the right hand member of Equation 1, consider first the circuit illustrated in Fig. 6. If $e_i$ and $e_o$ are the input and output voltages respectively, and using the symbols for the circuit constants as shown in the drawing, then:

(5)
$$\begin{cases} e_i = e_o + iR \\ i = C \frac{de_o}{dt} \end{cases}$$

The elimination of $i$ between these equations gives:

(6) $e_o + \frac{1}{RC} \int_0^t (e_i - e_o) dt$

Figure 7:
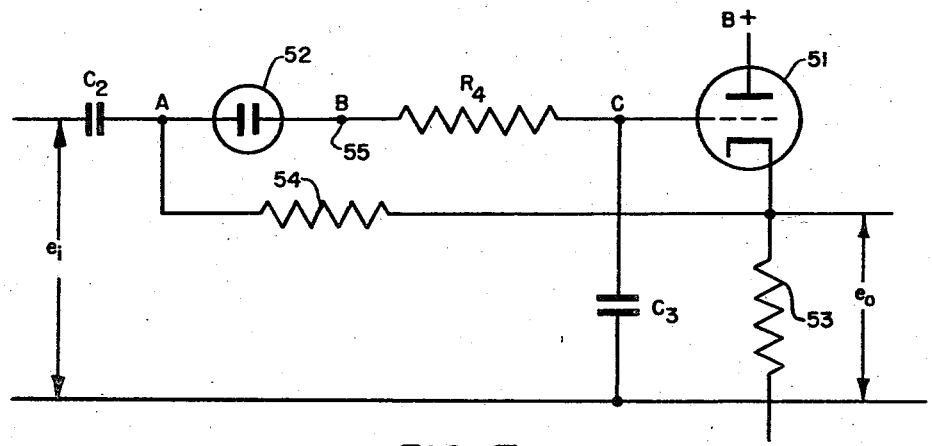

The $e_o$ which appears under the integral sign may be removed by modifying the basic circuit of Fig. 6 in the manner illustrated in Fig. 7. In this circuit, the input voltage, $e_i$, is coupled to the grid of a cathode follower 51 through a capacitor 50, a neon or other suitable glow discharge bulb 52, and resistor $R_4$, the latter being the equivalent of $R$ in Fig. 6. A capacitor $C_3$ is connected to the grid of cathode follower 51, and is equivalent to capacitor $C$ in Fig. 6. The plate of the cathode follower is connected to a positive power source and the cathode thereof is returned to the negative side of the power supply through a load resistor 53. To complete the circuit a resistor 54 is connected between the cathode of the cathode follower 51 and the junction between capacitor 50 and neon bulb 52.

The circuit of Fig. 7 is dependent for operation upon the nature of the applied signal $e_i$. This signal constitutes the pulsed, intermittent error signal previously described in connection with Fig. 3. Thus in the period between input pulses, $e_i$ is zero, and the capacitor 50 charges to the potential $e_o$ through resistor 54, which is also equal to the potential across $C_3$. When an input pulse is applied such that $e_i \neq 0$, the potential at the junction between capacitor 50 and neon bulb 52 instantaneously rises to the value $e_i + e_o$, causing the neon bulb 52 to break down applying this potential to the junction 55. This last statement assumes that the drop across the neon bulb 52 is negligible. During the period of neon bulb breakdown a voltage $e_i$ exists across $R_4$, provided that capacitor 50 is sufficiently large so that its discharge during the pulse is insignificant and provided that there is little change in $e_o$ during the pulse. The neon bulb 52 serves only as a switch separating capacitor 50 from capacitor $C_3$ during the period when capacitor 50 is recharged through resistor 54.

The potential across $C_3$ is applied to the cathode follower 51, and thus a substantially equal potential appears at the cathode, from which $e_o$ is taken. As a result of the switching action of the bulb 52, the potential across $C_3$, and hence $e_o$, is given by the equation:

(7) $e_o = \frac{1}{R_4 C_3} \int_0^t e_i dt$ indicating that the circuit electrically performs the integration of the error signal, as required by the second term on the right hand side of Equation 1. But the entire right hand member of Equation 1 requires that the error signal be added to its integral. Since as previously mentioned, during the pulse period the potential $R_4$ is equal to $e_i$, this addition is simply accomplished by changing the grid connection of cathode follower from the junction between $R_4$ and $C_3$ to junction 55 between neon bulb 52 and resistor $R_4$. With this connection, the voltage $e_o$ is given by:

(8) $e_o = e_i + \frac{1}{R_4 C_3} \int_0^t e_i dt$ providing the desired equation of motion, in accordance with the requirement of the right hand side of Equation 1.

Figure 8:
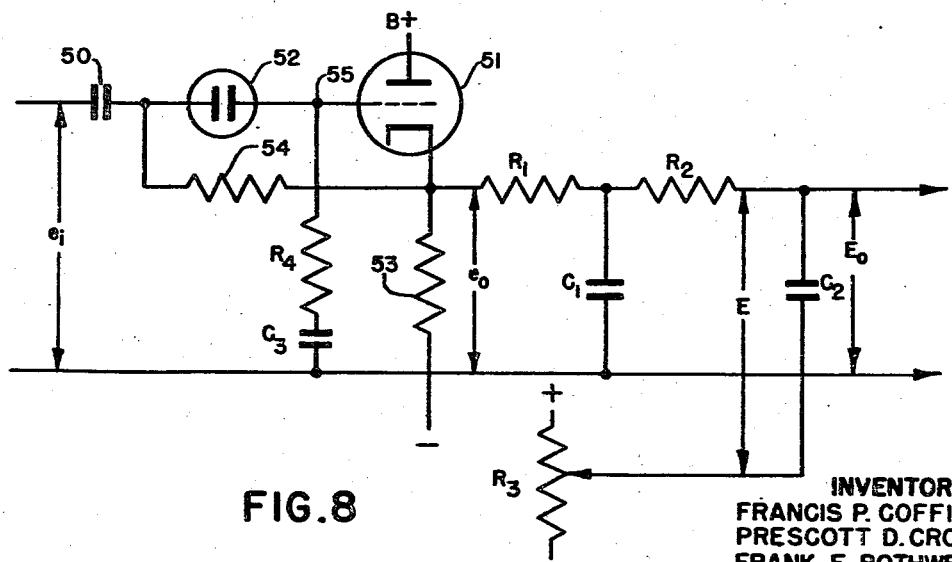

The combination of the circuits of Fig. 5, synthesized from the left hand side of Equation 1 and Fig. 7, from the right hand side, provides a complete basic circuit Fig. 8, having the desired overall performance required for data smoothing. In Fig. 8 the circuit components and potentials are designated as in Figs. 5 and 7. Thus, $e_i$ is the input error signal operative to generate an output voltage $E$, which is properly smoothed. The potential $E_o$ is maintained identically zero by a servo (not shown) mechanically connected to the movable element of $R_3$.

The equation of motion of the system is given by:

$$(9) \quad R_1 R_2 C_1 C_2 \frac{d^2 E}{dt^2} + (R_1 C_1 + R_1 C_2 + R_2 C_2)\frac{dE}{dt} = e_i + \frac{1}{R_4 C_3} \int_0^t e_i dt$$

which is of the form of Equation 1. The smoothing achieved by this circuit is a function of the nature of the applied error signal $e_1$, and the various circuit time constants. The time constants are determined by the particular application from circuit design principles which will not be discussed.

The complete data smoothing circuit diagram Fig. 3 incorporates the elements of the basic smoothing circuit developed in Fig. 8, and accordingly similar elements in these two drawings have been so designated. Thus the amplified error signal appearing at the plate of triode 41 is coupled through a capacitor 50 to the junction of resistor 54 and a switching circuit 52 which functions as neon bulb 52 in Fig. 8. In practical operation, a neon bulb has the disadvantage of a comparatively large breakdown voltage. In Fig. 3 the neon bulb has been replaced by a double diode, biased rectifier circuit comprising the oppositely phased diodes 71 and 72. Thus the plate of diode 71 and the cathode of diode 72 are connected together and to the junction between capacitor 50 and resistor 54. The other cathode and other plate are connected through a filter capacitor 73 shunted by the equal series resistors 74 and 75. The junction point between resistors 74 and 75 is directly connected to the control grid of triode cathode follower 51. The cathode of diode 71 is maintained at a positive potential relative to the plate of diode 72 by the output of a rectifier 76 which in turn is energized through transformer 77 the primary of which is connected across a power line 81. Diode 76 is a conventional half-wave rectifier having its cathode connected to one side of the secondary winding of transformer 77 and its plate connected to the opposite side thereof through the resistors 74 and 75. Capacitor 73 serves to smooth the voltage developed across resistors 74 and 75 and of the polarity as indicated. A high frequency by-pass capacitor 82 is shunted between one side of the secondary winding of transformer 77 and ground.

The rectified voltage developed by diode 76 thus places the cathode of rectifier 71 positive relative to the junction between resistors 74 and 75 and the plate of diode 72 negative relative thereto by an equal amount. Thus neither diode 71 or 72 will conduct until the potential applied at the junction between capacitor 50 and resistor 54 exceeds the magnitude of the bias. Effectively, therefore, in Fig. 3 between terminals 83 and 84 the circuit functions as the neon bulb 52 of Fig. 8 with the exception that the switching potential is set at a lower, predetermined value.

The control grid of the cathode follower 51 is connected to ground through the series combination of $R_4$ and $C_3$. In accordance with the circuit principles disclosed in connection with Fig. 8, the potential at the cathode follower grid is equal to the error signal plus the integral of the error signal. The cathode of triode 51 is returned to ground through a total resistance 53 comprising the series combination of a comparatively small resistor 86 and a larger resistor 87. Resistor 54 is connected from the capacitor 50 to the junction between resistors 86 and 87. It will be noted that in Fig. 8 the resistor 54 was connected directly to the cathode of cathode follower 51. In Fig. 3 the relation between resistors 86 and 87 is such that the output voltage appearing across resistor 87 is more nearly equal to the input grid potential. This connection will preclude conduction in diodes 71 or 72 in the period between pulses.

In order to provide a cathode follower plate voltage which is regulated and greater than that of source 36, a small neon bulb 91, or other suitable discharge tube, is connected between the plate of triode 51 and voltage source 36. The junction between the neon bulb and the plate is connected to a high potential, unregulated power supply at terminal 92 through a dropping resistor 93. It is evident that the potential at the plate of triode 51 is equal to the regulated power supply voltage 36 plus the constant drop across neon bulb 91.

The voltage appearing across the cathode resistor 87 is coupled into a network developed in connection with Fig. 5, and includes series resistor $R_1$ and shunt capacitor $C_1$, series resistor $R_2$ and shunt capacitor $C_2$. As described in connection with Fig. 5, capacitor $C_2$ is connected at one end thereof to the movable arm of a linear potentiometer $R_3$. The proper operating potential is obtained for $R_3$ by connecting it between the positive power supply 36 and ground through resistors 95 and 96 respectively. These last-mentioned resistors are preferably of equal magnitude for reasons which will hereinafter be disclosed. As is indicated by the broken line 97, the movable tap on the potentiometer $R_3$ is mechanically ganged to the rotor 32 of a servo motor 101.

The position servo mechanism illustrated in Fig. 3 is a conventional unit and functions to maintain the potential at terminal 102 of capacitor $C_2$ relative to another fixed potential, identically equal to zero. The reference potential is obtained by a voltage divider network comprising equal resistors 105 and 106 in series with the parallel combination of potentiometers 107 and 108. A differential amplifier comprising a double triode circuit 111 and 112 is used to compare the potential at terminal 102 connected to the grid of triode 111 and that of the variable tap 113 of potentiometer 107 connected to the grid of triode 112. The cathodes of the triodes 111 and 112 are connected together and to ground through a common resistor 114. The plates are returned to the positive regulated power supply through equal load resistors 115 and 116.

The servo unit 101 comprises essentially a two-phase motor having one winding 121 connected to the input power supply 81 through transformer 122. The second motor winding 123 is shunted by a phase changing capacitor 124 and is shunted across one winding 125 of a saturable core transformer 126. The primary winding 127 of the transformer 126 is connected across the power supply 81. A third winding 131 of the transformer 126 is connected between the plates of a double triode amplifier 132 and 133. The latter amplifier is energized from the power line 81 through transformer 135. As illustrated, the secondary of transformer 135 is connected between the center tap of the winding 131 and the common cathode connection of triodes 132 and 133. These cathodes are biased at a positive value by a tap on potentiometer 141 which is connected across the positive supply line 36 in series with resistor 142. The grids of triodes 132 and 133 are connected to the plates of the differential amplifier triodes 112 and 111, respectively.

If the potential at terminal 102 at capacitor C₂ is equal to that at 113 then the triodes 111 and 112 conduct equally, and thus the potentials of the grids of triodes 132 and 133 are equal. This in turn results in equal alternating plate currents in triodes 132 and 133, and as a result of the winding connection of transformer 126 does not energize the winding 123 of the motor 101. Accordingly, there is no rotation of motor shaft 32. If the potential at terminal 102 is disturbed and does not equal the potential at terminal 113, the differential amplifier 111, 112 will apply grid potentials to the triodes 132, 133, which will result in an output coupled through transformer 126 that causes motor rotation in that direction which drives the movable arm of potentiometer R₃ such that the potential at terminal 102 is made equal to that at terminal 113. If the movable tap at terminal 113 on potentiometer is adjusted so that the potential thereat is equal to one-half of the supply potential 36 then the normal zero position of the potentiometer R₃ will be at the midpoint thereof since resistors 95 and 96 are equal.

It is evident that the potentials of capacitor C₂ and capacitor C₁ must be brought to the potential of terminal 113 before operation of the system may be started. For this purpose, switch 151 is closed, thus energizing relays 152 and 153, and closing contacts 154 and 155. Closure of these contacts completes a connection from the variable tap of potentiometer 108 to the capacitors C₁, C₂ and C₃. The potentiometer 108 is then adjusted so that the capacitor potentials are equal to the potential at the terminal 113 following which switch 152 is opened. It is evident that for proper operation the insulation of capacitors C₁, C₂ and C₃ must be extremely high so that the potential thereof will not change due to leakage.

At this point it may be seen that an error signal other than zero applied at terminal 31 will pass through the electrical circuit equivalent to that discussed in connection with Fig. 8 and change the potential at the terminal 102. This in turn will energize the servo mechanism and result in rotation of shaft 32 and the arm of potentiometer R₃ of an amount determined by the magnitude of the error signal at terminal 31.

Returning now to the original problem of a radar system providing automatic tracking with a spinning antenna, the movement of shaft 32 is utilized in addition to zeroing the potential between terminals 102 and 113, to determine the operation of the circuit producing the tracking gate 26 in Fig. 2. The jitter of the error signal applied at 31 is, in accordance with the basic principles of this invention, smoothed so that the rotation of shaft 32 corresponds only with the true azimuth movement of the target. In this manner, the rectangular gate 26 is positioned such that its center remains on the true azimuth position of the target.

In radar systems generally the tracking circuits are inoperative until a target is located. The tracking gates are then moved to the position of the target for automatic operation. In Fig. 3, a normally open switch 161 is provided through which terminal 102 may be connected when desired to the positive voltage source 36 through resistor 162, or to ground through resistor 163. By raising the potential at terminal 102, the shaft 32 and tracking gate are caused to rotate in one direction whereas by lowering the potential at terminal 102, the tracking gate and shaft 32 are rotated in the opposite direction. This manual movement of the tracking gate is known as slewing.

Summarizing the basis of operation of the circuit disclosed in Fig. 3 comprises the passing of an input signal through a system which effectively removes signal jitter. This is accomplished by an electrical circuit having the characteristics of inertia and damping. When used in connection with radar equipment, a target may be located and tracked accurately and automatically on the information supplied once during each antenna scan.

It is of course possible to utilize the system hereinabove disclosed for various other data smoothing applications, the sole requirement being the application of a pulsed error signal. Thus since various modifications and extensions of the basic principle hereinabove disclosed may become evident to those skilled in the art, it is preferred that this invention be limited not by these specific disclosures but by the spirit and scope of the appended claims.

What is claimed is:

1. Apparatus for providing an output indicative of the trend of an input electrical error signal, said output being substantially independent of error signal jitter, said apparatus comprising a data smoothing circuit, means for applying said error signal to said data smoothing circuit, a position servo operative from said data smoothing circuit and providing said output, said data smoothing circuit being characterized by inertia and damping.

2. Apparatus for providing an output indicative of the trend of an input electrical error signal and substantially independent of discontinuous error signal jitter, comprising, in combination, a data smoothing circuit and a position servo mechanism, said position servo providing said output and being operative from said data smoothing circuit, means for obtaining the integral of said error signal, means in said data smoothing circuit including a resistance-capacitance network actuated by the sum of said error signal and said integral of said error signal, said data smoothing circuit being characterized by inertia and damping.

3. Apparatus for providing an output indicative of the trend of an input electrical error signal and substantially independent of discontinuous error signal jitter, comprising means for obtaining the integral of said error signal, means for obtaining a combined signal proportional to the sum of said error signal and said integral of said error signal, means for applying said combined signal to a resistance-capacitance network including a plurality of series resistance elements and shunt capacitance elements, said resistance-capacitance network providing the effects of inertia and damping, a potentiometer, one of said capacitance elements being connected to the movable tap of said potentiometer, said movable tap being operative from a position servo providing said output, said position servo being energized through said resistance-capacitance network.

4. Apparatus as in claim 3 wherein said means for obtaining the integral of said error signal includes electron tube switching means actuated by said error signal, said error signal comprising a plurality of electrical pulses, and means for charging and discharging said capacitance elements.

FRANCIS P. COFFIN, JR.
FRANK E. BOTHWELL.
PRESCOTT D. CROUT.